(12) United States Patent
Collins et al.

(10) Patent No.: US 6,794,434 B2
(45) Date of Patent: Sep. 21, 2004

(54) USE OF SURFACTANTS AS PLASTICIZERS TO REDUCE VOLATILE ORGANIC COMPOUNDS IN WATER-BASED POLYMER COATING COMPOSITIONS

(75) Inventors: Martha Jean Collins, Blountville, TN (US); Richard Alvin Martin, Kingsport, TN (US); Rebecca Reid Stockl, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/132,721

(22) Filed: Apr. 26, 2002

(65) Prior Publication Data

US 2003/0105197 A1 Jun. 5, 2003

Related U.S. Application Data

(63) Continuation of application No. 08/911,701, filed on Aug. 15, 1997, now abandoned.

(51) Int. Cl.$^7$ ................................................. C08K 5/06
(52) U.S. Cl. ...................... 524/366; 524/376; 524/377; 524/378
(58) Field of Search ................................. 524/266, 376, 524/377, 378

(56) References Cited

U.S. PATENT DOCUMENTS

| | | | |
|---|---|---|---|
| 3,714,099 A | 1/1973 | Biale | |
| 4,005,052 A | 1/1977 | Sekmakas | |
| 4,172,064 A | * 10/1979 | Keeler | ................. 260/29.6 TP |
| 4,250,269 A | 2/1981 | Buckman et al. | |
| 4,421,877 A | 12/1983 | Alvino | |
| 4,524,173 A | 6/1985 | Rehfuss et al. | |
| 4,801,671 A | 1/1989 | Shay et al. | |
| 4,812,510 A | 3/1989 | Barnett et al. | |
| 4,912,157 A | 3/1990 | Clark et al. | .................... 524/25 |
| 5,002,998 A | 3/1991 | Carey et al. | ................. 524/555 |
| 5,126,411 A | 6/1992 | Rauterkus et al. | |
| 5,179,158 A | 1/1993 | Azuma et al. | |
| 5,185,397 A | 2/1993 | Biale | ........................... 524/820 |
| 5,227,423 A | 7/1993 | Ingle | .......................... 524/458 |
| 5,240,979 A | 8/1993 | Maier et al. | |
| 5,284,905 A | 2/1994 | Chen et al. | |
| 5,349,026 A | 9/1994 | Emmons et al. | ......... 525/328.6 |
| 5,371,148 A | 12/1994 | Taylor et al. | ................ 252/393 |
| 5,478,883 A | 12/1995 | Anchor et al. | |
| 5,539,073 A | 7/1996 | Taylor et al. | ................ 526/323 |
| 5,554,675 A | 9/1996 | Clark et al. | ................. 524/376 |
| 5,705,553 A | 1/1998 | Kuropka | |

FOREIGN PATENT DOCUMENTS

| | | |
|---|---|---|
| EP | 0655495 A1 | 5/1995 |
| GB | 1234394 | 6/1971 |
| GB | 2 206 591 A | 1/1989 |

OTHER PUBLICATIONS

Air Products and Chemicals, Inc., "Surfynol® 400 Series Surfactants" Product Literature.
Emulsifiers & Detergents, pp. 93–194, 1997.
Air Products and Chemicals, Inc., "SURFYNOL® 104 Surfactants", Product Literature.

* cited by examiner

*Primary Examiner*—Edward J. Cain
(74) *Attorney, Agent, or Firm*—Nixon Peabody LLP

(57) ABSTRACT

The invention relates to an improved water-based polymer coating composition comprising a polymer resin, water and surfactant. As an improvement over prior water-based polymer coating compositions an anionic and/or nonionic surfactant is present in an amount effective to plasticize the coating formed from the composition. A water-based polymer coating composition of the invention is also substantially free from cosolvents. The invention also relates to a method of coating a substrate and a substrate which has been coated with a coating formulation of the invention.

19 Claims, No Drawings

USE OF SURFACTANTS AS PLASTICIZERS TO REDUCE VOLATILE ORGANIC COMPOUNDS IN WATER-BASED POLYMER COATING COMPOSITIONS

This application is a Continuation patent application under 37 C.F.R. §1.53(b), of prior application Ser. No. 08/911,701 filed on Aug. 15, 1997 now abandoned.

FIELD OF THE INVENTION

The invention relates to the use of surfactants as plasticizers in water-based polymer coating compositions to reduce or eliminate the need for conventional cosolvents and to reduce the overall volatile organic compounds (VOC's) of the coating composition.

BACKGROUND OF THE INVENTION

Both legislative and marketplace developments are pushing for reduced volatile organic emissions in a variety of industries. In an increasing number of industries, aqueous coating compositions continue to replace solvent-based coating compositions in efforts to significantly reduce volatile organic emissions. A variety of paints, inks, sealants and adhesives, for example, which were previously formulated with organic solvents are now formulated as aqueous compositions. Emissions from coatings compositions commonly result from volatile organic compounds (VOC's) in the compositions. The amounts of VOC's in a coating composition are expressed in grams per liter (g/l).

While the move from organic solvent-based to aqueous compositions brings environmental, safety and health benefits, aqueous coating compositions must still meet or exceed the performance standards expected from solvent-based coating compositions. The coatings or films must form at ambient temperatures (35° to 160° F.), yet have good performance properties after curing. For example, a coating composition should exhibit good print and block resistance and yield good adhesion and tensile properties. Once cured, most applications require that the coating be unaffected by environmental conditions such as water, humidity, and end-use temperature fluctuations.

Aqueous coating compositions may contain upwards of ten to twenty components which are generally identified by their function. For example, in addition to a resin or resins (also called latexes or binders), an aqueous coating composition may have pigments, extenders, antisettling agents, dispersants, surfactants (such as wetting agents, defoamers, and antifoamer), rheology modifiers, coalescing solvents, plasticizers, water, glycols, catalysts, biocides, crosslinkers, and colorants. Glycols are components added for freeze-thaw resistance, wet edge properties and as aids in low temperature coalescence. Representative glycols used for these purposes include ethylene glycol and propylene glycol. Because the glycols generally evaporate at ambient conditions, they contribute to VOC's found in aqueous coating formulations. A typical contribution to VOC's by glycols would be 100 to 200 grams per liter. Glycols are one of the first components aqueous coating manufacturers seek to decrease or eliminate in an effort to reduce emissions. However, the resulting coating may then suffer in the desired properties of low temperature coalescence, freeze/thaw resistance and wet edge.

Cosolvents (also known as coalescing solvents) are commonly employed in aqueous compositions to aid in film formation (or knitting-together) of hard latex particles. This hardness can be measured in terms of the starting film-formation temperature or of the glass transition temperature of the manufactured latex solid. As drying occurs, the cosolvents evaporate from the coating and the glass transition temperature of the coating approaches that of the starting resin. The addition of cosolvents enables the coating to behave like a softer film-forming material during drying and then perform as a harder, resistant film after drying. Examples of cosolvents include aliphatic and aromatic hydrocarbons and oxygenated solvents, such as alcohols, ketones and glycol ethers A typical amount of cosolvent ranges from 50 to 300 or more grams per liter of coating composition. Coating compositions based on cosolvents are described, for example, in *Paint Handbook,* 1–12 to 1–24 (Harold B. Crawford & Beatrice E. Eckes eds., 1981), incorporated here by reference. Because cosolvents present in the coating formulation contribute considerably to VOC's content and tend to contribute odor to the coating, cosolvents are becoming more undesirable in aqueous coatings. However, in many aqueous coating systems, the elimination of the cosolvent(s) result in either lack of film formation or such poor film formation that the coating has poor appearance and poor resistance properties. In some cases, plasticizers may be added to the aqueous coating formulation to replace some or all of the cosolvents. Typically, plasticizers are organic compounds that do not significantly evaporate at ambient conditions but remain in the coating. Examples of typical plasticizers would be chemicals from the phthalate, adipate, and benzoate families. They soften the polymer and are used to impart flexibility to an otherwise hard and brittle polymer. However, plasticizers, especially at high levels, can have deleterious effects on coating performance properties. Because the coating remains soft, it can have poor block and print resistance, poor stain resistance and a tacky feel.

Many of the components discussed above used to formulate waterborne coatings have small amounts of volatile compounds present along with the components. Some examples are the solvents that colorants are dispersed in, the solvents that catalysts are dispersed in, and even the glycols or solvents that are present in many commercial surfactants, biocides, defoamers, or rheology modifiers. For example, the low level of VOC calculated for the formulation used in Examples 1–6 below (11 g/l) arises from a particular component; the solvents present in the cobalt catalyst employed.

Surfactants are commonly used in coating formulations to improve wetting of the substrate by the coating, and wetting of the pigment by the resin. They can also improve formulating latitude by preventing shocking of the coating composition as various components are added and can increase the service life of the coating by increasing shelf stability. Typically, low levels of surfactants are used to accomplish these goals and mixtures of surfactants may be employed to impart one or more of the properties listed above. Surfactants are not generally volatile materials under ambient conditions and remain in the coating during the drying process. However, at the low concentrations typically used, little effect on polymer hardness or coating performance is observed. If too much surfactant is used in the aqueous coating composition, the wet coating could exhibit excessive foaming and poor thickening efficiency with thickeners while the cured coating could have problems with water sensitivity, poor exterior durability and poor block, stain and print resistance. Thus, surfactants are typically used in the lowest amounts necessary to achieve their beneficial properties while avoiding any detrimental effects.

A discussed above, a need exists to reduce or eliminate VOC's from aqueous coating compositions without effecting wet coating or end-use performance properties. The invention answers that need.

SUMMARY OF THE INVENTION

It has been discovered that surfactants can be employed at levels similar to those used by conventional cosolvents and function as a plasticizers in the coating, thus eliminating the need for conventional cosolvents and eliminate the VOC's associated with the cosolvents. Preferred surfactants of the invention can be used to plasticize the coating, aid in low temperature film formation and contribute to the typical properties associated with surfactants in coatings while not contributing deleteriously to the final balance of properties in the finished coating.

The invention relates to an improved water-based polymer coating composition comprising a polymer resin, water and surfactant. As an improvement over previous water-based polymer coating compositions an anionic and/or non-ionic surfactant is present in an amount effective to plasticize the coating formed from the composition. A water-based polymer coating composition of the invention is also substantially free from cosolvents. The invention also relates to a method of coating a substrate and a substrate which has been coated with a coating formulation of the invention.

DETAILED DESCRIPTION OF THE INVENTION

The invention relates to an improved water-based polymer coating composition comprising a polymer resin, water and surfactant. An anionic and/or nonionic surfactant is present in an amount effective to plasticize the coating formed from the composition. This improves prior water-based coating compositions by reducing or eliminating the cosolvent and reducing the amount of VOC's in the coating composition. A water-based polymer coating composition of the invention is also substantially free from cosolvents. Preferably, the VOC of the coating is less than 250 g/l, more preferably less than 50 g/l, even more preferably less than 25 g/l and most preferably VOC's are eliminated.

Aqueous emulsion polymers or latexes in both clear and pigmented form are well-known. Examples of their uses include interior and exterior architectural coatings, general metal coatings, adhesives, and the like. Examples include the aqueous coating compositions described in *Technology of Paints, Varnishes and Lacquers*, Robert E. Krieger Publishing Co., Huntington, N.Y. 1974, U.S. Pat. Nos. 5,002, 998 and 5,185,397 and in GB Patent No. 2,206,591, all of which are incorporated here by reference. Water-based polymer coating compositions conventionally contain from about 10 to about 40% by volume of solids.

Synthetic latexes are well known and can be made by emulsion polymerization techniques from styrene-butadiene copolymer, acrylate resins, polyvinyl acetate, and similar materials. For example, latexes can be formed by aqueous emulsion polymerization of ethylenically unsaturated monomers such as styrene, butyl acrylate, methyl methacrylate, vinyl acetate, vinyl 2-ethylhexanoate, acrylic acid, acrylonitrile, glycidyl methacrylate, 2-hydroxyethyl acrylate and the like. Preferred latexes for use in the invention include those described in U.S. Pat. No. 5,539,073 and copending application Ser. Nos. 08/861,431; 08/061,433; No. 60/047,324; 08/861,437; 08/861,436, all of which are incorporated here by reference.

Water-based polymer coating compositions may comprise pigments (organic or inorganic) and/or other additives and fillers known in the art. For example, a latex paint composition may comprise a pigment and one or more additives or fillers used in latex paints. Such additives or fillers include, but are not limited to, leveling, rheology, and flow control agents such as silicones, fluorocarbons, urethanes, or cellulosics; extenders; curing agents such as multifunctional isocyanates, multifunctional carbonates, multifunctional epoxides, or multifunctional acrylates; reactive coalescing aids such as those described in U.S. Pat. No. 5,349,026 (which are incorporated here by reference); flatting agents; pigment wetting and dispersing agents and surfactants; ultraviolet (LV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; crosslinking agents; or coalescing agents. Specific examples of such additives can be found in *Raw Materials Index*, (published by the National Paint & Coatings Association, 1500 Rhode Island Avenue, NW, Washington, D.C. 20005), which is incorporated here by reference.

As discussed above, low levels of surfactants have conventionally been used in water-based polymer coating composition for their surfactent properties. Advantageously, it has been discovered that surfactants can be employed at levels similar to those of conventional cosolvents and function as a plasticizers in the coating. This eliminates the need for conventional cosolvents and significantly reduces, or preferably eliminates, the VOC's in the coating composition, particularly VOC's associated with the cosolvents. Further, problems such as blocking, poor print and stain resistance associated with plasticizers, are eliminated.

Any anionic or nonionic surfactant, as well as mixtures, may be used in a water-based polymer coating composition of the invention. The surfactant is present in an amount effective to plasticize a coating formed from the composition, preferably ranging from about 3 to about 10% by weight of the dry polymer. Preferred anionic surfactants include alkali metal or ammonium salts of alkyl, aryl or alkylaryl sulfonates, sulfates, phosphates. More preferably, the anionic surfactant is selected from sodium lauryl sulfate, sodium octylphenol glycolether sulfate, sodium dodecylbenzene sulfonate, sodium lauryldiglycol sulfate, ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and mixtures thereof AEROSOL 18 surfactant, a 35% solution of disodium N-octyldecyl sulfosuccinimate in water and AEROSOL OT-75 surfactant, a 75% solution of sodium dioctyl sulfosuccinate in water, both available from Cytec Industries, Inc. are preferred anionic surfactants.

Preferably the nonionic surfactant is a polyether nonionic surfactant, more preferably, an alkyl polyglycol ether, an alkyl phenol polyglycol ether or a mixture thereof, such as those disclosed in U.S. Pat. Nos. 4,912,157 and 5,554,675 the disclosures of which are incorporated herein by reference. Preferred alkyl phenol polyglycol ethers include ethoxylation products of octylphenol, nonylphenol, diisopropyl phenol, triisopropyl phenol or mixtures thereof. Preferred alkyl polyglycol ethers include ethoxylation products of lauryl alcohol, oleyl alcohol, stearyl alcohol or mixtures thereof. Preferred nonionic surfactants include the TERGITOL 15-S-40 and TERGITOL NP-40 surfactants available from Union Carbide. TERGITOL 15-S-40 surfactant (CAS #68131-40-8) is a reaction product of a mixture of 11–15 carbon, linear secondary alcohols and ethylene oxide. TER- GITOL NP-40 surfactant is the reaction product of a nonylphenol and about 40 moles of ethylene oxide.

Most preferably the alkyl polyglycol ether is selected from compounds of the formula:

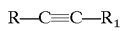

wherein R and $R_1$ are each selected from straight and branched alkyls having from 1 to 15 carbon atoms and wherein at least one of R and $R_1$ contains from 1 to 3 hydroxyl groups, and the H of each hydroxyl group is independently unsubstituted or substituted with a substituent of the formula

or

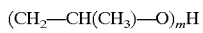

wherein n and m each range from 1 to about 50 and wherein the total of n and m is less than about 60. These compounds are known in the art and are available commercially from Air Products and Chemicals, Inc. under the trade name SURFYNOL®, including the SURFYNOL® 104 series, SURFYNOL® 420, 440, 465 and 485, also known as the SURFYNOL® 400 series.

SURFYNOL® 104 has the following formula:

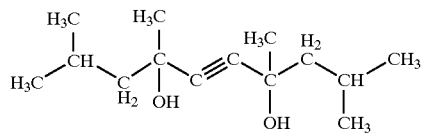

The SURFYNOL®400 series have the following general formula:

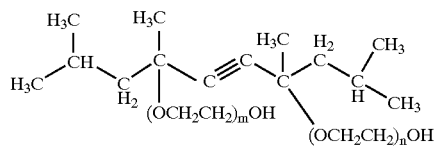

wherein the sum of m and n ranges from about 1 to about 30, with SURFYNOL®420 having 1.3 moles of ethylene oxide, SURFYNOL®440 having 3.5 moles of ethylene oxide, SURFYNOL®465 having 10 moles of ethylene oxide and SURFYNOL®485 having 30 moles of ethylene oxide.

Upon formulation, a coating formulation of the invention containing a polymer or waterborne polymer composition may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying, brushing, rolling or any other application method to coat a substrate. In general, the coating may be dried by heating but preferably is allowed to air dry. Advantageously, a coating employing a polymer of the invention may be thermally or ambiently cured. As a further aspect, the invention relates to a shaped or formed article which has been coated with a coating formulation of the invention.

The following examples are intended to illustrate, not limit, the invention. The examples of various coating compositions of the invention use the following materials not described above:

TAMOL 1124 is a dispersant sold by Rohm and Haas.

ROPAQUE OP-62LO is an opaque polymer sold by Rohm and Haas.

ACRYSOL RM-5 is a rheology modifier (thickener) sold by Rohm and Haas.

COBALT HYDROCURE II (cobalt neodecanoate, 45% solids) is a cobalt drier sold by Mooney Chemical, Inc., Cleveland, Ohio.

FOAMASTER AP and VF are defoamers sold by Henkel Corporation, Ambler, Pa.

TRITON CF-10 is a surfactant sold by Union Carbide Chemicals and Plastics, Corp.

CELLOSIZE 4400H is a rheology modifier sold by Union Carbide, Bound Brook, N.J.

DOWICIL 75 is a preservative sold by DOW Chemical Company, Midland, Mich.

TI-PURE R-900, R-746 and R-760 are titanium dioxide pigments sold by Du Pont, Wilmington, Del.

OMYACARB UF is a calcium carbonate pigment, sold by Omya Inc., Proctor, Vt.

RHEVOIS CR2 is a rheology modifier sold by Allied Colloids, Suffolk, Va.

TAFIGEL PUR 45 is a rheology modifier distributed by King Industries, Norwalk Conn.

TREM LF-40 is a polymerizable surfactant sold by Henkel Corporation, Ambler, Pa.

HITENOL HS-20 is a polymerizable surfactant available from Daiichi Kogy Seiyaku.

POLYM N-G is a poly(alkyl ethylenimine) available from the BASF Corporation.

TERGITOL 15-S-40 and TERGITOL NP-40 are surfactants available from Union Carbide Chemicals and Plastics, Corp.

AEROSOL 18 and AEROSOL OT-75 are anionic surfactants available from Cytec, Industries, Inc.

PROXEL GXL is a preservative sold by Zeneca Biocides, Wilmington, Del.

DURAMITE is a calcium carbonate pigment sold by ECC America, Atlanta, Ga.

NYTAL 300 is a talc pigment sold by RT Vanderbilt, Norwalk, Conn.

The following methods were used to evaluate the coatings prepared according to the invention.

Constant Temperature and Humidity Room:

Films were prepared and film measurements were conducted at ASTM standard conditions for laboratory testing of 73.5±3.5° F. (23±2° C.) and 50±5% relative humidity.

Minimum Film Forming Temperature (MFFT):

Minimum film forming temperature (MFFT) is determined by casting a wet latex film with a 4-mil applicator on an MFFT bar set at a temperature range in which the film will coalesce during drying, visually observing the film on the MFFT bar after 30 minutes, and recording the temperature at which the film appears to have coalesced and is free of cracks and film defects.

Tensile:

Tensile tests are performed in the CTH room on a on a United Tensile Tester, which has constant rate of elongation machine. Film samples are obtained by casting the sample on release paper with a 7 mil bird bar, drying the film for the desired time at the stated conditions, and cutting a dogboneshaped thin-film sample with a 1" wide die. The film is measured for film thickness, mounted in the tensile tester grips and tested at a cross head speed of 1"/minute using a 5 lb-force load cell. Ten samples are run and the five samples with the greater breaking stress are averaged for all tensile values reported according to ASTM Glass Transition:

Onset and midpoint temperatures were determined on film samples using a differential scanning calorimeter (DSC) in a nitrogen atmosphere at heating rate of 20° C./minute. Values quoted are from the reheat curve.

Paint Viscosity:

Paint viscosity (in Krebs Units) was measured after 24 hours using a Krebs-Stormer viscometer.

Gloss:

Gloss was measured on 6 mil (wet) thick films cast on Leneta 2B opacity paper after 24 hours using a Micro-Tri-Glossmeter by BYK-Gardner according to ASTM method D 523 Test Method for Specular Gloss.

Blocking Resistance:

Blocking resistance was determined using 6 mil (wet) films on Leneta 2B opacity paper according to ASTM 4946 Test Method for Blocking Resistance of Architectural Paints using 1 psi pressure after film dried to designated times. Heated block resistance was determined in a forced air oven at 120° F. with the painted surfaces face-to-face under 1 psi pressure for 30 minutes. The tests were numerically rated where a rating of 10 represents 100% pass where painted surfaces lift apart with no noise; a rating of 9-4 represents the degree of noise when painted surfaces are separated; a rating of 3-1 represents degree of destruction of the painted surfaces when the two surfaces are separated; and a rating of 0 represents 100% fail where the painted surfaces flow completely together and complete destruction of the films occurs upon separation.

Print Resistance:

Print resistance was determined using 6 mil (wet) films on Leneta 2B opacity paper according to ASTM D 2064-91 Test Method for Print Resistance of Architectural Paints using a 4 pound weight placed on top of a #6 black rubber stopper which was placed on four layers of cheesecloth after film dried to designated times. Heated print resistance was determined in a forced air oven at 120° F. with folded cheesecloth (as above) under a pressure of 4 pounds for 30 minutes. The tests were numerically rated as per ASTM D2064-91.

Scrub Resistance:

Scrub resistance was determined following ASTM D2486 Test Method for Scrub Resistance of Architectural Coating. The coating is applied at 7 mil wet on Scrub Test Charts Form P121-10N and allowed to dry for the specified period of time. The panel is placed in a Gardco Scrub Machine, Model D-10V, 10 g of Standardized Scrub Medium (abrasive type) for ASTM D2486 and D3450 is placed on the scrub brush, the panel is wet with 5 ml DI water, the test machine counter is zeroed, and the test is run at the maximum test speed on the machine. After each 400 cycles before failure, the brush is removed and 10 more g of scrub medium is added evenly on the bristles, the brush is replaced, 5 ml of DI water is placed on the panel and the test is continued. The test is run to failure. Failure is defined as the number of cycles to remove the paint film fully in on continuous line across the width of the shim.

Wet Adhesion Test:

This procedure tests the coatings adhesion to an aged, alkyd substrate under wet, scrubbing conditions. This procedure is described in "VYNATE™ (Union Carbide Chemicals and Plastics Corporation)—Vinyl Emulsion Vehicles for Semigloss Interior Architectural Coatings," M. J. Collins, et. al., presented at the 19th Annual "Water-Borne High-Solids and Powder Coating Symposium", Feb. 26–28, 1992, New Orleans, La., USA.

A ten-mil drawdown of a commercial gloss alkyd paint is made on a "Leneta" scrub panel (adhesion varies from alkyd to alkyd—a Glidden Industrial Enamel was used.) The alkyd film is allowed to age one week at ambient conditions, then baked at 110° F. for 24 hours, and then aged at least one more week at ambient conditions. A seven-mil drawdown of the test paint is then made over the aged alkyd and allowed to air dry three days. (In order to differentiate between samples that pass this test, dry times may be shortened. Seven days is a common period, and occasionally 5 hours dry time is used. Constant temperature/humidity conditions, 72° F./50%, are normally used for drying.) The test paint is then cross-hatched with a razor and submerged in water for 30 minutes. The paint film is inspected for blistering and scratched with the fingernail to gauge the adhesion. While still wet, the panel is placed on a "Gardner" scrub machine. Ten ml of five percent "LAVA™" soap slurry are added, and the Nylon scrub brush (WG 2000NB) is passed over the scored paint film area. Water is added as needed to keep the paint film wet (flooded). The number of brushing cycles for initial peel and ten percent peel are noted. The number of cycles for complete removal of the film is often noted also.

Stain Test:

Apply test paint with 6 mil draw down bar. After draw down, allow the test paint(s) to cure for 21 days at 72° F.±2 and relative humidity of 50%±2. Expose the paint film to black shoe polish, catsup, TOP JOB®, crayon, grape juice, red KOOL AID® and PINE SOL® for a total time of 5 hours. Expose the paint film to mustard, coffee and nigrosine for a total of 30 minutes. Expose the paint film to red ink and blank ink for a total of 5 minutes. Expose the paint film to iodine for 30 seconds. Cover all stains with 1 ½ inch watch glass for the specified exposure time. Remove the stain with a soft cloth soaked in a mild detergent solution. Rate the degree of stain using a scale of 1–5 with 1=no stain and 5=extreme stain of film destroyed.

Low Temperature Coalescence:

Low temperature coalescence was determined in accordance with ASTM D3793-89.

EXAMPLES

The following polymer resins were prepared for use in the water-based polymer coating compositions of the invention:

Resin A

To a 5 gallon resin kettle equipped with a condenser, nitrogen purge, and above surface feed tube were added 4176.6 g of water, 57.55 g of sodium carbonate, 22.65 g of TREM LF-40 (40% solids in water), 10.82 g of TERGITOL NP-40 (70% solids in water), 138.3 g of methyl methacrylate, 228.4 g of styrene, 266.4 g of 2-ethylhexyl acrylate, and 1.3 g of trimethylolpropane triacrylate. A nitrogen purge was begun, then the contents of the reactor brought up to 80° C. at 125 rpm. After reaching 80° C., an initiator charge composed of 60.8 g of sodium persulfate dissolved in 343.4 g of demineralized water were added to the reactor. An emulsified monomer mixture composed of 2597.7 g of water, 65.56 g of TREM LF-40, 57.2 g of TERGITOL NP-40, 849.5 g of methyl methacrylate, 1402.8 g of styrene, 1636.6 g of 2-ethylhexyl acrylate, and 7.8 g of trimethylolpropane triacrylate followed by 100 g line flush of demineralized water, was fed over 125 minutes. Five minutes after the emulsion feed was begun, an initiator solution composed of 34.3 g of sodium persulfate dissolved in 884.9 g of deionized water was fed in over 255 minutes After the flush, a second emulsion feed composed of 1725.7 g of water, 121.0 g of AEROSOL 18 (35% solution in water), 48.2 g of TERGITOL NP-40 (70%), 2371.0 g of styrene, 1654.7 g of 2-ethylhexyl acrylate, 378.2 g of allyl methacrylate, 189.1 g of dimethylaminoethyl methacrylate, 40.2 g of 2-ethylhexyl 3-mercaptopropionate, and 189.1 g of ROHAMERE 6852-0 (50% solution in water) was fed into the reactor over 71 minutes. After the last feed, the temperature was cooled to 65° C. and a solution of 117.4 g of demineralized water, 27.0 g of sodium formaldehyde sulfoxylate, and 49.8 g of a 0.5% solution of iron (II) sulfate by seven water (chelated with EDTA) was charged to the reactor. Then a solution 29.01 g of t-butylhydroperoxide (70% in water) dissolved in 117.4 g of demineralized water was over 40.6 minutes while heating continued. The emulsion was cooled and pumped from the reactor. Solids Level, 48.08%; DSC reheat midpoint glass transition 15° C.

Resin B

To a 5 gallon resin kettle equipped with a condenser, nitrogen purge, and above surface feed tube were added 4176.6 g of water, 57.6 g of sodium carbonate, 22.65 g of TREM LF-40 (40% solids in water), 10.82 g of TERGITOL NP-40 (70% solids in water), 138.3 g of methyl methacrylate, 228.4 g of styrene, 266.4 g of 2-ethylhexyl acrylate, and 1.3 g of trimethylolpropane triacrylate. A nitrogen purge was begun, then the contents of the reactor brought up to 80° C. at 125 rpm. After reaching 80° C., an initiator charge composed of 60.8 g of sodium persulfate dissolved in 343.4 g of demineralized water were added to the reactor. An emulsified monomer mixture composed of 2597.7 g of water, 65.56 g of TREM LF-40, 57.2 g of TERGITOL NP-40, 849.5 g of methyl methacrylate, 1402.8 g of styrene, 1636.6 g of 2-ethylhexyl acrylate, and 7.8 g of trimethylolpropane triacrylate followed by 100 g line flush of demineralized water, was fed over 125 minutes. Five minutes after the emulsion feed was begun, an initiator solution composed of 34.3 g of sodium persulfate dissolved in 884.9 g of deionized water was fed in over 255 minutes After the flush, a second emulsion feed composed of 1617.9 g of water, 121.0 g of AEROSOL 18 (35% solution in water), 48.2 g of TERGITOL NP-40 (70%), 2276.4 g of styrene, 1654.7 g of 2-ethylhexyl acrylate, 378.2 g of allyl methacrylate, 189.1 g of dimethylaminoethyl methacrylate, 40.2 g of 2-ethylhexyl 3-mercaptopropionate, 378.2 g of ROHAMERE 6852-0 (50% solution in water) and 13.2 g of 2-acrylamido-2-methylpropanesulfonate (50% in water) was fed into the reactor over 71 minutes. After the last feed, the temperature was cooled to 65° C. and a solution of 117.4 g of demineralized water, 27.0 g of sodium formaldehyde sulfoxylate, 49.8 g of a 0.5% solution of iron (II) sulfate by seven water (chelated with EDTA) was charged to the reactor. Then a solution 29.01 g of t-butylhydroperoxide (70% in water) dissolved in 117.4 g of demineralized water was over 40.6 minutes while heating continued. The emulsion was cooled and pumped from the reactor. Solids Level, 47.25%; DSC reheat midpoint glass transition 14° C.

Resin C

To a 50 gallon reactor were added 41765.9 g of water, 575.5 g of sodium carbonate, 226.6 g of TREM LF-40 (40% solids in water), 108.2 g of TERGITOL NP-40 (70% solids in water), 1382.8 g of methyl methacrylate, 2283.6 g of styrene, 2664.2 g of 2-ethythexyl acrylate, and 12.7 g of trimethylolpropane triacrylate. A nitrogen purge was begun, then the contents of the reactor brought up to 80° C. at 125 rpm. After reaching 80° C., an initiator charge composed of 607.5 g of sodium persulfate dissolved in 3433.6 g of demineralized water were added to the reactor. An emulsified monomer mixture composed of 2597.7 g of water, 655.6 g of TREM LF-40, 572.1 g of TERGITOL NP-40, 8494.7 g of methyl methacrylate, 14027.8 g of styrene, 16365.9 g of 2-ethylhexyl acrylate, and 77.9 g of trimethylolpropane triacrylate followed by 1000 g line flush of demineralized water, was fed over 125 minutes. Five minutes after the emulsion feed was begun, an initiator solution composed of 343.4 g of sodium persulfate dissolved in 8848.5 g of deionized water was fed in over 255 minutes After the flush, a second emulsion feed composed of 15178.5 g of water, 1210.1 g of AEROSOL 18 (35% solution in water), 481.6 g of TERGITOL NP-40 (70%), 22764.2 g of styrene, 16547.5 g of 2-ethylhexyl acrylate, 3782.2 g of allyl-methacrylate, 1891.1 g of dimethylaminoethyl methacrylate, 401.9 g of 2-ethylhexyl 3-mercaptopropionate, 3782.2 g of ROHAMER 6852-0 (50% solution in water) and 132.1 g of 2-acrylamido-2-methylpropanesulfonate (50% in water) triacrylate followed by 1000 g line flush of demineralized water, was fed into the reactor over 71 minutes. After the last feed, the temperature was cooled to 65° C. and a solution of 1174.0 g of demineralized water, 269.6 g of sodium formaldehyde sulfoxylate, 497.5 g of a 0.5% solution of iron (II) sulfate by seven water (chelated with EDTA) was charged to the reactor. Then a solution 290.1 g of t-butylhydroperoxide (70% in water) dissolved in 1174.0 g of demineralized water was over 40.6 minutes while heating continued. The emulsion was cooled and pumped from the reactor. Solids Level, 47.8%; DSC reheat midpoint glass transition 20° C.

Resin D

To a 50 gallon reactor were added 37589.3 g of water, 518 g of sodium carbonate, 203.9 g of TREM LF-40 (40% solids in water), 97.4 g of TERGITOL NP-40 (70% solids in water), 1244.6 g of methyl methacrylate, 2055.3 g of styrene, 2397.8 g of 2-ethylhexyl acrylate, and 11.4 g of trimethylolpropane triacrylate. A nitrogen purge was begun, then the contents of the reactor brought up to 80° C. at 125 rpm. After reaching 80° C., an initiator charge composed of 546.7 g of sodium persulfate dissolved in 3090.2 g of demineralized water were added to the reactor. An emulsified monomer mixture composed of 23379.4 g of water, 590.0 g of TREM LF-40, 514.9 g of TERGITOL NP-40, 7645.2 g of methyl methacrylate, 12625.0 g of styrene, 14729.3 g of 2-ethylhexyl acrylate, and 70.14 g of trimethylolpropane triacrylate followed by 900 g line flush of demineralized water, was fed over 95 minutes Five minutes after the emulsion feed was begun, an initiator solution composed of 309.0 g of sodium persulfate dissolved in 7963.7 g of deionized water was fed in over 255 minutes After the flush, a second emulsion feed composed of 13660.7 g of water, 1089.1 g of AEROSOL 18 (35% solution in water), 433.4 g of TERGITOL NP-40 (70%), 20487.8 g of styrene, 14892.7 g of 2-ethylhexyl acrylate, 3404.0 g of allyl methacrylate, 1702.0 g of dimethylaminoethyl methacrylate, 361.7 g of 2-ethylhexyl 3-mercaptopropionate, 3404.0 g of ROHAMERE 6852-0 (50% solution in water) and 118.8 g of 2-acrylamido-2-methylpropanesulfonate (50% in water) triacrylate followed by 900 g line flush of demineralized water, was fed into the reactor over 95 minutes. After the last feed, the temperature was cooled to 65° C. and a solution of 1056.6 g of demineralized water, 242.7 g of sodium formaldehyde sulfoxylate, 447.8 g of a 0.5% solution of iron (II) sulfate by seven water (chelated with EDTA) was charged to the reactor. Then a solution 261.1 g of t-butylhydroperoxide (70% in water) dissolved in 1056.6 g of demineralized water was over 40.6 minutes while heating continued. The emulsion was cooled and pumped from the reactor. Solids Level, 45.5%; DSC reheat midpoint glass transition 15° C.

Resin E

To a 5 gallon resin kettle equipped with a condenser, nitrogen purge, and above surface feed tube were added 4176.6 g of water, 57.6 g of sodium carbonate, 22.65 g of TREM LF-40 (40% solids in water), 10.82 g of TERGITOL NP-40 (70% solids in water), 138.3 g of methyl methacrylate, 228.4 g of styrene, 266.4 g of 2-ethylhexyl acrylate, and 1.3 g of trimethylolpropane triacrylate. A nitrogen purge was begun, then the contents of the reactor brought up to 80° C. at 125 rpm. After reaching 80° C., an initiator charge composed of 60.8 g of sodium persulfate dissolved in 343.4 g of demineralized water were added to the reactor. An emulsified monomer mixture composed of 2597.7 g of water, 65.56 g of TREM LF-40, 57.2 g of TERGITOL NP-40, 849.5 g of methyl methacrylate, 1402.8 g of styrene, 1636.6 g of 2-ethylhexyl acrylate, and 7.8 g of trimethylolpropane triacrylate followed by 100 g line flush of demineralized water, was fed over 125 minutes Five minutes after the emulsion feed was begun, an initiator solution composed of 34.3 g of sodium persulfate dissolved in 884.9 g of deionized water was fed in over 255 minutes After the flush, a second emulsion feed composed of 1631.1 g of water, 121.0 g of AEROSOL 18 (35% solution in water), 48.2 g of TERGITOL NP-40 (70%), 2276.4 g of styrene, 1654.7 g of 2-ethylhexyl acrylate, 378.2 g of allyl methacrylate, 189.1 g of dimethylaminoethyl methacrylate, 40.2 g of 2-ethylhexyl 3-mercaptopropionate, and 378.2 g of ROHAMERE 6852-0 (50% solution in water) was fed into the reactor over 71 minutes. After the last feed, the temperature was cooled to 65° C. and a solution of 117.4 g of demineralized water, 27.0 g of sodium formaldehyde sulfoxylate, 49.8 g of a 0.5% solution of iron (II) sulfate by seven water (chelated with EDTA) was charged to the reactor. Then a solution 29.01 g of t-butylhydroperoxide (70% in water) dissolved in 117.4 g of demineralized water was over 40.6 minutes while heating continued. The emulsion was cooled and pumped from the reactor. Solids Level, 46.9%.

Resin F

To a 50 gallon reactor were added 40364.1 g of water, 503.8 g of sodium carbonate, 1151.61 g of HITENOL HS-20 (9.7% solution in water), 133.2 g of TERGITOL NP-40 (70% solids in water), 431.9 g of methyl methacrylate, 714.4 g of styrene, 833.1 g of 2-ethylhexyl acrylate, and 4.0 g of trimethylolpropane triacrylate. A nitrogen purge was begun, then the contents of the reactor brought up to 80° C. at 125 rpm. After reaching 80° C., an initiator charge composed of 531.7 g of sodium persulfate dissolved in 3005.0 g of demineralized water were added to the reactor. An emulsified monomer mixture composed of 23973.4 g of water, 237.4 g of AEROSOL OT-75 (75% solution in water), 705.4 g of TERGITOL NP-40, 8212.4 g of methyl methacrylate, 13562.1 g of styrene, 15823.9 g of 2-ethylhexyl acrylate, and 7.52 g of trimethylolpropane triacrylate followed by 899.7 g line flush of demineralized water, was fed over 95 minutes. Five minutes after the emulsion feed was begun, an initiator solution composed of 300.5 g of sodium persulfate dissolved in 7744.6 g of deionized water was fed in over 255 minutes After the flush, a second emulsion feed composed of 15334.5 g of water, 754.0 g of AEROSOL 18 (35% solution in water), 351.3 g of TERGITOL NP-40 (70%), 20347.6 g of styrene, 14202.6 g of 2-ethylhexyl acrylate, 3244.3 g of allyl methacrylate, 1619.5 g of dimethylaminoethyl methacrylate, 345.0 g of 2-ethylhexyl 3-mercaptopropionate, and 1622.2 g of ROHAMERE 6852-0 (50% solution in water) was fed into the reactor over 95 minutes. After the last feed, the temperature was cooled to 65° C. and a solution of 1034.7 g of demineralized water, 236.0 g of sodium formaldehyde sulfoxylate, 435.4 g of a 0.5% solution of iron (II) sulfate by seven water (chelated with EDTA) was charged to the reactor. Then a solution 253.9 g of t-butylhydroperoxide (70% in water) dissolved in 1034.7 g of demineralized water was over 40.6 minutes while heating continued. The emulsion was cooled and pumped from the reactor. Solids Level, 45.9%.

Resin G

To a 3000 ml resin kettle equipped with a condenser, nitrogen purge, and subsurface feed tube were added 480 g of water, 1.296 g of HITENOL HS-20, 1.59 g of TERGITOL 15-S-40 (68%), 5.8 g of sodium carbonate, 4.85 g of methyl methacrylate, 7.8 g of styrene, 9.86 g of 2-ethylhexyl acrylate, and 0.23 g of trimethylolpropane triacrylate. A nitrogen purge was begun, then the contents of the reactor brought up to 80° C. at 400 rpm. After reaching 80° C., an initiator charge composed of 6.164 g of sodium persulfate dissolved in 34.84 g of deionized water were added to the reactor. An emulsion feed at 5.248 g/minute composed of 208 g of water, 2.752 g of AEROSOL OT-75, 8.408 g of TERGITOL 15-S40 (68%), 92.16 g of methyl methacrylate, 148.50 g of styrene, 187.37 g of 2-ethylhexyl acrylate, and 4.37 g of trimethylolpropane triacrylate was begun. Five minutes after the first emulsion feed was begun, an initiator solution composed of 3.48 g of sodium persulfate dissolved in 89.78 g of deionized water was fed in at 0.336 g/min. After the first emulsion feed was completed, 64 g of water was fed through the monomer feed line at 52.48 g/minute and the reactor was held at temperature for 25 minutes. After the hold, a second emulsion feed composed of 138 g of water, 8.74 g of AEROSOL 18, 4.22 g of TERGITOL 15-S-40 (70%), 203.52 g of styrene, 172.71 g of 2-ethylhexyl acrylate, 2.77 g of 2-ethylhexyl 3-mercaptopropionate, 95.95 g of acetoacetyl methacrylate, and 4.80 g of 2-acrylamido-2-methylpropanesulfonate (50% in water) was fed into the reactor at 8 g/min. Ten minutes after the last feed, the temperature was cooled to 65° C. and a solution of 0.8 g of isoascorbic acid in 16 g of water and 1.6 g of a 0.5% solution of iron (II) sulfate by seven water (chelated with EDTA) in water was charged to the reactor. Then an initiator solution of 1.04 g of t-butylhydroperoxide (70% in water) dissolved in 16 g of water was fed at 0.38 g/min while heating continued. The emulsion was cooled then filtered through 100 mesh wire screen. Solids Level, 47.1%.

Resin H

To a 3000 ml resin kettle equipped with a condenser, nitrogen purge, and subsurface feed tube were added 720.4 g of water, 39.2 g of HITENOL HS-20, 1.08 g of TERGITOL 15-S-40 (68%), 5.8 g of sodium carbonate, 25.52 g of methyl methacrylate, 35.2 g of styrene, 26.4 g of 2-ethylhexyl acrylate, and 0.88 g of trimethylolpropane triacrylate. A nitrogen purge was begun, then the contents of the reactor brought up to 80° C. at 400 rpm. After reaching 80° C., an initiator charge composed of 6.032 g of sodium persulfate dissolved in 34.84 g of deionized water were added to the reactor. An emulsion feed at 5.248 g/minute composed of 158.4 g of water, 15.72 g of AEROSOL OT-75, 11.004 g of TERGITOL 15-S-40 (68%), 107.81 g of methyl methacrylate, 148.70 g of styrene, 111.53 g of 2-ethylhexyl acrylate, and 3.72 g of trimethylolpropane triacrylate was begun. Five minutes after the first emulsion feed was begun, an initiator solution composed of 3.41 g of sodium persulfate dissolved in 87.2 g of deionized water was fed in at 0.336 g/min. After the first emulsion feed was completed, 60 g of water was fed through the monomer feed line at 52.48 g/minute and the reactor was held at temperature for 25 minutes. After the hold, a second emulsion feed composed of 138.4 g of water, 9.72 g of AEROSOL 18, 6.99 g of TERGITOL 15-S-40 (10%), 191.90 g of styrene, 43.25 g of methyl methacrylate, 143.93 g of 2-ethylhexyl acrylate, 95.95 g of acetoacetyl methacrylate, and 9.448 g of 2-acrylamido-2-methylpropanesulfonate (50% in water) was fed into the reactor at 5.248 g/min. Ten minutes after the last feed, the temperature was cooled to 65° C. and a solution of 1.04 g of isoascorbic acid in 16 g of water and 1.6 g of a 0.5% solution of iron (II) sulfate by seven water (chelated with EDTA) in water was charged to the reactor. Then an initiator solution of 1.04 g of t-butylhydroperoxide (70% in water) dissolved in 16 g of water was fed at 0.38 g/min. while heating continued. The emulsion was cooled to less than 35° C. then filtered through 100 mesh wire screen. Solids Level, 47.1%.

Resin I

To 752.0 g of Resin H was added 56.1 g of a 50% solution of POLYMIN-G in water with stirring.

Resin J

This resin blend was prepared by adding 556.5 g of Resin G to a glass resin kettle. At ambient temperature with stirring, first 199.5 g of Resin I, then 10.5 g of 0.3 molar solution of ammonium carbonate in water was added.

EXAMPLE 1

SURFYNOL®104 was added to Resin A as shown in Table 1 below at increasing percentage levels based on weight of surfactant per weight of resin solid. SUR-FYNOL®104 is a solid at room temperature and had to be warmed to 140° F. to liquefy before adding to the latex. The depression in both minimum film forming temperature (MFFT) and glass transition (Tg) are characteristic of plasticization behavior.

TABLE 1

Minimum Film Forming Temperature (visual) and Glass Transition (Tg ° C.) Measurements of Latex Resin at increasing levels of SURFYNOL ® 104:

| | % | | | |
|---|---|---|---|---|
| | 0 | 1 | 2 | 3 | 4 |
| MFFT (° C.) | 14 | 1.4 | 11.4 | 9.3 | 8.7 |
| Tg Midpoint | 14 | 12.9 | 11.1 | 8.4 | 7.2 |

EXAMPLE 2

SURFYNOL® 104 or 420 was added to Resin B as shown in Table 2 below at 3.4% weight of surfactant solid per weight of resin solid. The depression in the onset and midpoint Tg° C. of the samples with either SURFYNOL° versus the neat resin is indicative of plasticization behavior.

TABLE 2

Onset/midpoint Glass Transition (Tg ° C.) measurements on Four Latex Resins with and without SURFYNOL ® 104 or 420 added:

| Latex Sample | Tg ° C.*/ without surfactant | Tg ° C.* with SURFYNOL ® 104 | Tg ° C.* with SURFYNOL ® 420 |
|---|---|---|---|
| RESIN B | 6/15 | 1/9 | 2/9 |
| RESIN C | 9/18 | 3/11 | −3/8 |
| RESIN D | 7/16 | −1/8 | 3/10 |
| RESIN E | 5/13 | −3/5 | −1/7 |

*/ onset/midpoint

EXAMPLE 3

Plasticization can also be demonstrated using tensile properties of emulsion films. As shown in Table 3 below, when SURFYNOL® 104 was added to Resin A (3.4% weight of surfactant solid per weight of resin solid) there was a reduction in break, work and modulus along with an increase in elongation. This is typical of a change in performance observed in a plasticized film.

TABLE 3

Tensile properties of Clear Resin A film with and without SURFYNOL ® 104:

| Sample | Ultimate Break (psi) | Ultimate Elongation (%) | Work | Initial Modulus (ksi) |
|---|---|---|---|---|
| − surfactant | 1106 | 370 | 1841 | 7.8 |
| + surfactant | 780 | 536 | 1318 | 0.7 |

EXAMPLE 4

In this Example a low VOC glossy latex coating (<11 g/1) was prepared with and without surfactant.

Preparation of Zero Volatile Organic Compound (VOC) Grind;

A 15 gallon grind (Grind 1) was prepared using a Premier disperser, as below, and a portion of the grind was used to letdown each specified paint.

| Material: | Volume (gallons): |
|---|---|
| Water | 48.00 |
| TAMOL 1124 | 4.00 |
| TRITON CF-10 | 2.00 |
| FOAMASTER AP | 2.00 |
| DOWICIL 75 | 1.00 |
| Disperse well then add under agitation: | |
| TI-PURE R-900 | 200.00 |

The batch was dispersed at high speed until the dispersion passed 7 on a Hegman gauge, then 19 lb of water was added. The bath was then filtered through a Fulflo filter and stored.

Preparation of Aqueous Latex Coatings at 18 Pigment Volume Concentration (PVC):

The following four paint letdowns were prepared using the Zero VOC grind (above) and emulsions shown.

Paint Letdown (weight in g):

Paint Sample (see Table 4):

| Material: | | 1 | 2 | 3 | 4 |
|---|---|---|---|---|---|
| Zero VOC Grind 1 | | 490 | 140 | 140 | 140 |
| Resin B | | 819 | 234 | 234 | 234 |
| FOAMASTER AP | ⎫ | 7.2 | 1.0 | 1.0 | 1.0 |
| FOAMASTER VF | ⎬ Premix | 10.9 | 1.5 | 1.5 | 1.5 |
| HYDROCURE II | ⎬ | 15.9 | 2.2 | 2.2 | 2.2 |
| SURFYNOL 104A | ⎭ | — | 1.3 | 2.6 | 3.9 |
| Water | | 210 | 56 | 58 | 59 |
| Then add: | | | | | |
| ACRYSOL RM-5 Solution | | 182 | 52 | 52 | 52 |
| Then add: | | | | | |
| CELLOSIZE 4400H Solution | | 35 | 10 | 11.2 | 11.2 |
| Then adjust pH to 8.3 to 8.7 using 28% ammonia below: | | | | | |
| NH₄OH | | 0.83 | 3.2 | 3.2 | 3.2 |

TABLE 4

Coating Formulations of Example 4 with and without Surfactant

| Sample | Level |
|---|---|
| 1 | 0 |
| 2 | 1.1 |
| 3 | 2.3 |
| 4 | 3.4 |

TABLE 5

Gloss, Low Temperature Coalescence, Stain and Scrub Properties of Coating Formulations of Example 4 with and without Surfactant:

| Sample | 60° Gloss | 20° Gloss | Low Temperature Coalescence | Total Stain | 8 day Scrub | 15 day Scrub | 21 day Scrub |
|---|---|---|---|---|---|---|---|
| 1 | 65 | 22 | Failed | 37 | 78 | 71 | 98 |
| 2 | 75 | 40 | Failed | 31 | 73 | 115 | 84 |
| 3 | 77 | 42 | Failed | 33 | 86 | 101 | 84 |
| 4 | 79 | 41 | Passed −2 Opacity | 34 | 75 | 99 | 58 |

TABLE 6

Break Through and Total Failure Wet Adhesion Properties of Coating Formulations with and without Surfactant:

| Sample | 1 Day Wet Adhesion: Break Through/ Total Failure | 8 Day Wet Adhesion: BT/TF | 15 Day Wet Adhesion: BT/TF | 21 Day Wet Adhesion: BT/TF |
|---|---|---|---|---|
| 1 | 57/151 | 142/516 | 200/549 | 544/2081 |
| 2 | 45/118 | 163/661 | 107/593 | 259/1126 |
| 3 | 41/130 | 239/816 | 169/848 | 369/1214 |
| 4 | 38/151 | 100/344 | 166/514 | 1210/2925 |

TABLE 7a

Block Resistance Properties of Coating Formulations with and without Surfactant:

| | One day Face-to-Face Block Resistance | | | | Seven day Face-to-Face Block Resistance | | | |
|---|---|---|---|---|---|---|---|---|
| Sample | 1 day dry | 2 day dry | 7 day dry | 21 day dry | 1 day dry | 2 day dry | 7 day dry | 21 day dry |
| 1 | 6 | 7 | 7 | 9 | 3 | 3 | 6 | 8 |
| 2 | 6 | 5 | 7 | 8 | 2 | 3 | 9 | 9 |
| 3 | 8 | 4 | 7 | 9 | 1 | 3 | 6 | 9 |
| 4 | 4 | 4 | 5 | 8 | 1 | 3 | 8 | 6 |

TABLE 7b

Wet Block Resistance Properties of Coating Formulations with and without Surfactant:

| | One day Face-to-Face Block Resistance | | | | Seven day Face-to-Face Block Resistance | | | |
|---|---|---|---|---|---|---|---|---|
| Sample | 1 day dry | 2 day dry | 7 day dry | 21 day dry | 1 day dry | 2 day dry | 7 day dry | 21 day dry |
| 1 | 0 | 1 | 0 | 5 | 0 | 0 | 0 | 4 |
| 2 | 0 | 1 | 0 | 0 | 1 | 0 | 0 | 2 |
| 3 | 0 | 0 | 0 | 1 | 0 | 0 | 0 | 2 |
| 4 | 0 | 1 | 0 | 3 | 0 | 0 | 0 | 1 |

TABLE 7c

Print Resistance Properties of Coating Formulations with and without Surfactant:

| | One day Face-to-Face Block Resistance | | | | Seven day Face-to-Face Block Resistance | | | |
|---|---|---|---|---|---|---|---|---|
| Sample | 1 day dry | 2 day dry | 7 day dry | 21 day dry | 1 day dry | 2 day dry | 7 day dry | 21 day dry |
| 1 | 4 | 4 | 6 | 8 | 4 | 6 | 6 | 6 |
| 2 | 6 | 6 | 6 | 6 | 2 | 8 | 8 | 8 |
| 3 | 6 | 4 | 6 | 8 | 2 | 8 | 8 | 6 |
| 4 | 6 | 4 | 4 | 8 | 4 | 6 | 8 | 6 |

TABLE 7d

Heated Block and Print Resistance Properties of Coating Formulations of Example 4 With and Without Surfactant:

| Sample | ASTM Heated Block | ASTM Heated Block |
|---|---|---|
| 1 | 8 | 8 |
| 2 | 4 | 8 |
| 3 | 7 | 8 |
| 4 | 4 | 8 |

EXAMPLE 5

In this example low VOC stain latex coatings (<11 g/l) with and without surfactant were prepared.

Preparation of Calcium Carbonate Grind:

| Material: | Weight (g): |
|---|---|
| Water | 100 |
| TAMOL 1124 | 8.0 |
| TRITON CF-10 | 4.0 |
| FOAMASTER AP | 30.0 |
| DOWICIL 75 | 10.0 |
| Mix well at high speed for 5 minutes | |
| OMYACARB UF | 400.0 |
| Water | 24.0 |
| Disperse high speed for 15 minutes: | |
| Water | 50 |

Letdown of Satin Coatings:

| | Sample 5: | Sample 6: |
|---|---|---|
| Calcium Carbonate Grind | 30.1 | 30.1 |
| Add slowly under agitation | | |
| RESIN F | 220.2 | 220.2 |
| R-746 TiO2 Slurry | 83.0 | 83.0 |
| Ropaque OP-62LO | 50.0 | 50.0 |
| Water | 77.0 | 77.0 |
| Premix: | | |
| SURFYNOL 420 | — | 3.45 |
| FOAMASTER AP | — | 1.15 |
| FOAMASTER VF | — | 1.0 |
| 5% Cobalt HYDROCURE II | — | 2.0 |
| TAFIGEL PUR 45 Solution | 10.0 | 10.0 |
| Adjust Viscosity to 85 KU +/- 3 with the following: | | |
| RHEOVIS CR2 Solution | 20.0 | 20.0 |
| Ammonia (28%) | 0.5 | 0.5 |

TABLE 8

Satin Coating Formulations With and Without Surfactant:

| Sample | Level |
|---|---|
| 5 | 0 |
| 6 | 3.8 |

TABLE 9

Gloss, Low Temperature Coalescence, Stain and Scrub Properties of Coating Formulations with and without Surfactant:

| Sample | 60° Gloss | 20° Gloss | Low Temperature Coalescence | Total Stain | 8 day Scrub | 15 day Scrub | 21 day Scrub |
|---|---|---|---|---|---|---|---|
| 5 | 36 | 7 | Failed | 32 | 354 | 660 | 629 |
| 6 | 45 | 9 | Passed, -2 Opacity | 31 | 758 | 814 | 873 |

TABLE 10

Break Through and Total Failure Wet Adhesion Properties of Coating Formulations with and without Surfactant:

| Sample: | 1 Day Wet Adhesion: Break Through/Total Failure | 8 Day Wet Adhesion: BT/TF | 15 Day Wet Adhesion: BT/TF | 21 Day Wet Adhesion: BT/TF |
|---|---|---|---|---|
| 5 | 1058/3000+ | 3000+/3000+ | 1827/3000+ | 3000+/3000+ |
| 6 | 1660/3000+ | 3000+/3000+ | 2223/3000+ | 3000+/3000+ |

TABLE 11a

Block Resistance Properties of Coating Formulations with and without Surfactant:

| | One day Face-to-Face Block Resistance | | | | Seven day Face-to-Face Block Resistance | | | |
|---|---|---|---|---|---|---|---|---|
| Sample | 1 day dry | 2 day dry | 7 day dry | 21 day dry | 1 day dry | 2 day dry | 7 day dry | 21 day dry |
| 5 | 8 | 6 | 7 | 6 | 6 | 5 | 7 | 6 |
| 6 | 4 | 4 | 8 | 7 | 5 | 4 | 7 | 7 |

TABLE 11b

Wet Block Resistance Properties of Coating Formulations with and without Surfactant:

| | One day Face-to-Face Block Resistance | | | | Seven day Face-to-Face Block Resistance | | | |
|---|---|---|---|---|---|---|---|---|
| Sample | 1 day dry | 2 day dry | 7 day dry | 21 day dry | 1 day dry | 2 day dry | 7 day dry | 21 day dry |
| 5 | 1 | 6 | 6 | 6 | 1 | 3 | 6 | 5 |
| 6 | 0 | 5 | 5 | 6 | 1 | 2 | 6 | 6 |

TABLE 11c

Print Resistance Properties of Coating Formulations with and without Surfactant:

| | One day Face-to-Face Block Resistance | | | | Seven day Face-to-Face Block Resistance | | | |
|---|---|---|---|---|---|---|---|---|
| Sample | 1 day dry | 2 day dry | 7 day dry | 21 day dry | 1 day dry | 2 day dry | 7 day dry | 21 day dry |
| 5 | 4 | 6 | 6 | 8 | 4 | 6 | 8 | 8 |
| 6 | 0 | 4 | 4 | 8 | 2 | 4 | 6 | 6 |

TABLE 11d

Heated Block and Print Resistance Properties of Coating Formulations with and without Surfactant:

| Sample | ASTM Heated Block | ASTM Heated Print |
|---|---|---|
| 5 | 7 | 8 |
| 6 | 6 | 8 |

Examples 4 and 5 demonstrate that the addition of SURFYNOL® 104 or 420 at 3.6% or higher on resin nonvolatile content to very low VOC paints (11 g/l calculated) resulted in the following balance of paint properties; pass low temperature coalescence (Tables 5 and 9), improved scrub resistance (Table 5 and 9), and higher gloss with no significant loss in block, print, wet adhesion or stain resistance properties (Tables 5–11).

EXAMPLE 6

In this Example a coating composition containg SURFYNOL® 420 at 5.6% was compared on containing cosolvent blend Eastman EB Solvent/Eastman DB Solvent. The substitution of SURFYNOL® 420 at 5.6% on resin nonvolatile content to make a very low VOC paint (less than 25 g/l VOC) in sample 8 for a cosolvent-containing paint (Eastman EB Solvent/Eastman DB Solvent at 100 g/l VOC) found in sample 7 resulted in the following balance of paint properties; sample 8 passes low temperature coalescence over a range of relative humidities whereas sample 7 does not (Table 13), and equivalent scrub resistance (Table 14), block resistance, print resistance, and wet adhesion (Tables 14, 15 and 16).

Preparation of Grind:
A 15 gallon grind was prepared using a Premier disperser, as below, and a portion of the grind was used to letdown each specified paint.

Preparation of PREMIX 1:

| | |
|---|---|
| Eastman EB Solvent | 15.0 |
| Eastman DB Solvent | 15.0 |
| FOAMASTER AP | 6.7 |
| FOAMASTER VF | 3.2 |
| AEROSOL OT-75 | 1.0 |

Preparation of PREMIX 2:

| | |
|---|---|
| SURFYNOL® 420 | 11.2 |
| FOAMASTER AP | 6.7 |
| FOAMASTER VF | 3.2 |
| AEROSOL OT-75 | 1.0 |

Preparation of PREMIX 1:

| | |
|---|---|
| Eastman EB Solvent | 15.0 |
| Eastman DB Solvent | 15.0 |
| FOAMASTER AP | 6.7 |
| FOAMASTER VF | 3.2 |
| AEROSOL OT-75 | 1.0 |

Preparation of PREMIX 2:

| | |
|---|---|
| SURFYNOL® 420 | 11.2 |
| FOAMASTER AP | 6.7 |
| FOAMASTER VF | 3.2 |
| AEROSOL OT-75 | 1.0 |

Preparation of Satin Latex Coatings:
The following two paint letdowns were prepared using the grind (above) and emulsions shown.

Paint Letdown (weight in g):

| | Paint Sample (see Table 8): | |
|---|---|---|
| Material: | 7 | 8 |
| Grind | 83.0 | 83.0 |
| RESIN J | 217.5 | 217.5 |
| TIPURE R-746 Slurry | 124.0 | 124.0 |
| Premix 1 | 20.5 | — |
| Premix 2 | — | 11.0 |
| Deionized Water | 23.5 | 33.0 |
| TAFIGEL PUR 45 Solution | 15.2 | 15.0 |

Paint Letdown (weight in g):

| | Paint Sample (see Table 8): | |
|---|---|---|
| Material: | 7 | 8 |
| Adjust viscosity to 89 (+/−3) KU with the following: | | |
| CR2 Solution | 14.0 | 15.0 |
| Then adjust pH to 8.7 to 9.1 using 0.3 molar ammonium carbonate: | | |
| $(NH_4)_2CO_3$ | 0.0 | 1.0 |

Satin Coating Formulations on Resin J with SURFYNOL® 420 or cosolvents:

TABLE 12

Coating Formulations with coalescent or with surfactant

| Sample | SURFYNOL® 420 Level | Eastman EB/ Eastman DB Level | 85/60/20° Gloss |
|---|---|---|---|
| 7 | 0 | 7.3/7.3 | 18/18/3 |
| 8 | 5.6 | 0 | 16/15/3 |

TABLE 13

Low Temperature Coalescence with Coalescent or Surfactant:

| Sample | Low Temperature Coalescence: 50% Relative Humidity and 40° F. | Low Temperature Coalescence: 50% Relative Humidity and 40° F. | Low Temperature Coalescence: 50% Relative Humidity and 40° F. |
|---|---|---|---|
| 7 | Failed | Failed | Failed |
| 8 | Passed | Passed | Passed |

TABLE 14

Break Through Wet Adhesion and Scrub Resistance Properties of Coating Formulations with and without Surfactant:

| Sample | 1 Day Wet Adhesion Break Through | 8 Day Scrub Resistance | 15 Day Scrub Resistance | 21 Day Scrub Resistance |
|---|---|---|---|---|
| 7 | 3000 | 1000 | 1409 | 1885 |
| 8 | 3000 | 1000 | 1238 | 1952 |

TABLE 15

Block Resistance Properties of Coating Formulations with and without Surfactant:

| | One day Face-to-Face Block Resistance | | | | Seven day Face-to-Face Block Resistance | | | |
|---|---|---|---|---|---|---|---|---|
| Sample | 1 day dry | 2 day dry | 7 day dry | 21 day dry | 1 day dry | 2 day dry | 7 day dry | 21 day dry |
| 7 | 4 | 6 | — | 8 | 6 | 7 | — | 10 |
| 8 | 8 | 8 | — | 10 | 7 | 8 | — | 10 |

TABLE 16

Print Resistance Properties of Coating Formulations with and without Surfactant:

| Sample | One day Face-to-Face Block Resistance | | | | Seven day Face-to-Face Block Resistance | | | |
|---|---|---|---|---|---|---|---|---|
| | 1 day dry | 2 day dry | 7 day dry | 21 day dry | 1 day dry | 2 day dry | 7 day dry | 21 day dry |
| 7 | 8 | 8 | — | 10 | 8 | 8 | — | 8 |
| 8 | 8 | 8 | — | 10 | 8 | 8 | — | 8 |

The above examples demonstrate that surfactants function as a plasticizers in the coating, thus eliminating the need for conventional cosolvents and eliminate the VOC's associated with the cosolvents. Preferably, according to the invention, surfactants function to plasticize coating, aid in low temperature film formation and contribute to the typical properties not previously known for surfactants in coatings while not contributing deleteriously to the final balance of properties in the finished coating.

We claim:

1. A method for lowering the minimum film formation temperature of a water-based polymer composition, comprising the step of
adding to the water-based polymer composition about 3% to about 10%, by weight of the dry polymer, of an alkyl polyglycol ether nonionic surfactant.

2. A method according to claim 1, wherein the alkyl polyglycol ether is an ethoxylation product of a lauryl alcohol, an oleyl alcohol, a stearyl alcohol or mixtures thereof.

3. A method according to claim 1, wherein the alkyl polyglycol ether is selected from the compounds of the formula:

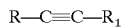

wherein R and $R_1$ are each selected from a straight and branched alkyls having from 1 to 15 carbon atoms and wherein at least one of R and $R_1$ contains from 1 to 3 hydroxyl groups, and the H of each hydroxyl group is independently substituted with a substituent of the formula

or

wherein n and m each range from 1 to about 50 and wherein the total of n and m is less than about 60.

4. A method according to claim 3, wherein the alkyl polyglycol ether comprises at least one compound of the formula:

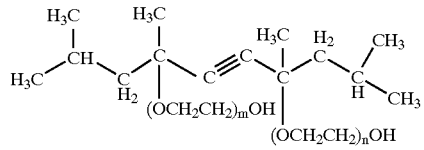

wherein the sum of m and n ranges from about 1 to about 30.

5. A method according to claim 1, wherein the water-based polymer composition has a VOC of less than 250 g/l.

6. A method according to claim 5, wherein the water-based polymer composition has a VOC of less than 50 g/l.

7. A method according to claim 1, wherein the water-based polymer composition further comprises an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skimming agent, an anti-flooding agent, an anti-floating agent, a fungicide, a mildewcide, a corrosion inhibitor, a thickening agent, a plasticizer, a reactive plasticizer, a curing agent and a coalescing agent.

8. A method of coating a substrate, comprising the steps of:
preparing the substrate with a water-based polymer composition comprising a polymer resin, water, and about 3% to about 10%, by weight of the dry polymer, of an alkyl polyglycol ether nonionic surfactant, wherein said surfactant is added after polymerization of the polymer resin, and
coating the substrate with said water-based polymer composition.

9. A method according to claim 8, wherein the alkyl polyglycol ether is selected from the compounds of the formula:

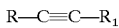

wherein R and $R_1$ are each selected from a straight and branched alkyls having from 1 to 15 carbon atoms and wherein at least one of R and $R_1$ contains from 1 to 3 hydroxyl groups, and the H of each hydroxyl group is independently substituted with a substituent of the formula

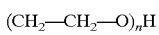

or

wherein n and m each range from 1 to about 50 and wherein the total of n and m is less than about 60.

10. A method according to claim 9, wherein the alkyl polyglycol ether comprises at least one compound of the formula:

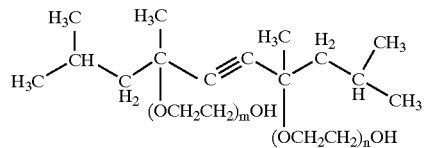

wherein the sum of m and n ranges from about 1 to about 30.

11. A method according to claim 8, wherein the substrate is selected from wood, wood by-products, gypsum board, plastic, metal and textile products.

12. A method for lowering the minimum film formation temperature of a water-based polymer composition, comprising the step of
adding to the water-based polymer composition about 3% to about 10%, by weight of the dry polymer, of a nonionic surfactant, wherein the nonionic surfactant is selected from the compounds of the formula:

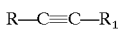

wherein R and $R_1$ are each selected from a straight and branched alkyls having from 1 to 15 carbon atoms and wherein at least one of R and R$_1$ contains from 1 to 3 hydroxyl groups, and the H of each hydroxyl group is independently unsubstituted or substituted with a substituent of the formula (CH$_2$—CH$_2$—O)$_n$H or (CH$_2$—CH(CH$_3$)—O)$_m$H wherein n and m each range from 1 to about 50 and wherein the total of n and m is less than about 60.

13. A method according to claim 12, wherein the nonionic surfactant is selected from the group consisting of:

(i) at least one compound of the formula:

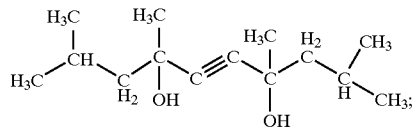

(ii) at least one compound of the formula:

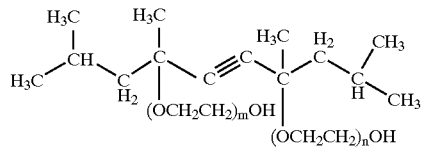

wherein the sum of m and n ranges from about 1 to about 30; and (iii) mixtures of (i) and (ii).

14. A method according to claim 12, wherein the water-based polymer composition has a VOC of less than 250 g/l.

15. A method according to claim 14, wherein the water-based polymer composition has a VOC of less than 50 g/l.

16. A method according to claim 12, wherein the water-based polymer composition further comprises an additive selected from a solvent, a pigment, a leveling agent, a rheology agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skimming agent, an anti-flooding agent, an anti-floating agent, a fungicide, a mildewcide, a corrosion inhibitor, a thickening agent, a plasticizer, a reactive plasticizer, a curing agent and a coalescing agent.

17. A method of coating a substrate, comprising the steps of:

preparing a water-based polymer composition comprising a polymer, resin, water and about 3% to about 10% by weight of the dry polymer, of a nonionic surfactant selected from the compounds of the formula:

R—C≡C—R$_1$ wherein R and R$_1$ are each selected from a straight and branched alkyls having from 1 to 15 carbon atoms and wherein at least one of R and R$_1$ contains from 1 to 3 hydroxyl groups, and the H of each hydroxyl group is independently unsubstituted or substituted with a substituent of the formula (CH$_2$—CH$_2$—O)$_n$H or (CH$_2$—CH(CH$_3$)—O)$_m$H wherein n and m each range from 1 to about 50 and wherein the total of n and m is less than about 60, wherein said surfactant is added after polymerization of the polymer resin; and coating the substrate with said water-based polymer composition.

18. A method according to claim 17, wherein the nonionic surfactant is selected from the group consisting of:

(i) at least one compound of the formula:

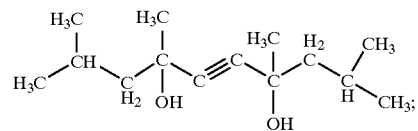

(ii) at least one compound of the formula:

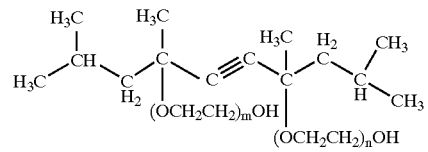

wherein the sum of m and n ranges from about 1 to about 30; and (iii) mixtures of (i) and (ii).

19. A method according to claim 17, wherein the substrate is selected from wood, wood by-products, gypsum board, plastic, metal and textile products.

* * * * *